US009992246B2

(12) United States Patent
Shen et al.

(10) Patent No.: US 9,992,246 B2
(45) Date of Patent: Jun. 5, 2018

(54) METHODS, APPARATUS, AND SYSTEMS FOR INSTANTLY SHARING VIDEO CONTENT ON SOCIAL MEDIA

(71) Applicant: TVU Networks Corporation, Mountian View, CA (US)

(72) Inventors: Paul Shen, Woodside, CA (US); Matthew Richard McEwen, San Jose, CA (US); Shiwen Yao, Sunnyvale, CA (US)

(73) Assignee: TVU Networks Corporation, Mountain View, CA (US)

( * ) Notice: Subject to any disclaimer, the term of this patent is extended or adjusted under 35 U.S.C. 154(b) by 167 days.

(21) Appl. No.: 14/666,486

(22) Filed: Mar. 24, 2015

(65) Prior Publication Data
US 2015/0312289 A1 Oct. 29, 2015

Related U.S. Application Data

(60) Provisional application No. 61/971,255, filed on Mar. 27, 2014.

(51) Int. Cl.
*H04L 29/06* (2006.01)
*H04L 29/08* (2006.01)
(Continued)

(52) U.S. Cl.
CPC .......... *H04L 65/403* (2013.01); *G06Q 50/00* (2013.01); *H04L 51/32* (2013.01); *H04L 67/02* (2013.01);
(Continued)

(58) Field of Classification Search
CPC ....... H04L 65/403; H04L 51/32; H04L 67/02; H04W 4/206; H04N 21/2743; H04N 21/41407; H04N 21/4788; G06Q 50/00
See application file for complete search history.

(56) References Cited

U.S. PATENT DOCUMENTS 6,504,571 B1 * 1/2003 Narayanaswami ... G06F 17/30265
348/231.99
7,472,175 B2 12/2008 Bartholomew
(Continued)

FOREIGN PATENT DOCUMENTS

EP 0959418 11/1999
WO 2014035729 3/2014

OTHER PUBLICATIONS

Steve's Digicams, "Camcorders vs. Cameras: For Video and Stills", Mar. 17, 2014, Home Knowledge Center, 1 page.*
(Continued)

*Primary Examiner* — Arvin Eskandarnia
*Assistant Examiner* — Amy Ling
(74) *Attorney, Agent, or Firm* — Lipsitz & McAllister, LLC

(57) ABSTRACT

Methods, apparatus, and systems for instantly posting images or video clips to social media websites during recording of video content are provided. A video capture device is provided for recording video content. A social media integration application is associated with the video capture device. The selection of a still image or video clip during recording of video content is enabled via a one-touch process. The selected still image or video clip is then processed by the social media integration application such that the still image or video clip is at least one of directly forwarded to and posted on one or more pre-selected social media websites via a network or forwarded to and posted on the one or more pre-selected social media websites via a web browser interface.

20 Claims, 2 Drawing Sheets

(51) Int. Cl.
  *H04N 21/2743* (2011.01)
  *G06Q 50/00* (2012.01)
  *H04L 12/58* (2006.01)
  *H04W 4/20* (2018.01)
  *H04N 21/414* (2011.01)
  *H04N 21/4788* (2011.01)

(52) U.S. Cl.
  CPC ........ *H04W 4/206* (2013.01); *H04N 21/2743* (2013.01); *H04N 21/41407* (2013.01); *H04N 21/4788* (2013.01)

(56) References Cited

U.S. PATENT DOCUMENTS

| | | | |
|---|---|---|---|
| 8,890,866 B2 | 11/2014 | Meadow et al. | |
| 8,943,140 B1* | 1/2015 | Kothari | H04L 65/403 709/203 |
| 9,258,698 B2* | 2/2016 | Singh | G06F 17/3089 |
| 2007/0067104 A1 | 3/2007 | Mays | |
| 2008/0266324 A1 | 10/2008 | Lynch et al. | |
| 2010/0122174 A1 | 5/2010 | Snibbe et al. | |
| 2010/0333034 A1* | 12/2010 | Carlson | G06F 3/0489 715/835 |
| 2010/0333155 A1 | 12/2010 | Royall et al. | |
| 2011/0025851 A1 | 2/2011 | Rumble | |
| 2011/0029883 A1 | 2/2011 | Lussier et al. | |
| 2011/0030031 A1 | 2/2011 | Lussier et al. | |
| 2011/0157037 A1 | 6/2011 | Shamir et al. | |
| 2011/0276423 A1* | 11/2011 | Davidson | G06Q 30/06 705/26.1 |
| 2011/0306326 A1 | 12/2011 | Reed et al. | |
| 2011/0311199 A1 | 12/2011 | Fay et al. | |
| 2012/0060177 A1 | 3/2012 | Stinson, III et al. | |
| 2012/0062590 A1 | 3/2012 | Morohoshi et al. | |
| 2012/0102124 A1 | 4/2012 | Hansson et al. | |
| 2012/0192239 A1* | 7/2012 | Harwell | H04N 21/2343 725/109 |
| 2012/0282914 A1 | 11/2012 | Alexander | |
| 2013/0073623 A1 | 3/2013 | Nguyen et al. | |
| 2013/0268962 A1 | 10/2013 | Snider et al. | |
| 2013/0302005 A1* | 11/2013 | Harwell | H04N 21/2408 386/200 |
| 2013/0329086 A1 | 12/2013 | Malone | |
| 2014/0012895 A1 | 1/2014 | Lieberman et al. | |
| 2014/0067955 A1 | 3/2014 | Christian | |
| 2014/0213304 A1 | 7/2014 | Beckett et al. | |
| 2014/0258158 A1 | 9/2014 | Levy | |
| 2015/0139615 A1* | 5/2015 | Hill | H04N 21/2743 386/285 |
| 2015/0231505 A1* | 8/2015 | Imai | A63F 13/71 463/29 |

OTHER PUBLICATIONS

International Search Report for PCT/US2015/022438, 1 page, Jul. 1, 2015.
Unknown, Foto-Upload-Automatik abschalten, Oct. 5, 2013, [retrieved on Oct. 20, 2017], 2 pages, <URL: https://web.archive.org/web/20140310214310/https://www.heise.de/ct/hotline/Foto-Upload-Automatik-abschalten-2056868.html>.
Unknown, How to Use Moto G Camera and Change Camera Settings?, Jan. 7, 2014, [retrieved on Sep. 8, 2017], 7 pages, <URL: https://web.archive.org/web/20140107071551/http://al-laboutmotog.com:80/moto-g-how-to-guide/how-to-use-moto-g-camera/>.

* cited by examiner

METHODS, APPARATUS, AND SYSTEMS FOR INSTANTLY SHARING VIDEO CONTENT ON SOCIAL MEDIA

This application claims the benefit of U.S. Provisional Application No. 61/971,255 filed on Mar. 27, 2014, which is incorporated herein and made a part hereof by reference for all purposes.

BACKGROUND OF THE INVENTION

The present invention relates to the field of video recording/transmission and social media. More specifically, the present invention relates to methods, apparatus, and systems for participating in social media activities while undertaking a live video transmission or recording session by instantly sharing video content (still images or video clips from recorded video) during the recording of the video content with social media websites.

Social media began as a Web darling and has now permeated the social fabric of people's everyday lives. The television broadcast industry has taken notice, and social media has become an important part of television production and news distribution. In particular, social media has had a large impact on live television production that includes news, sports, and coverage of major events, entertainment, and more. With audiences having many more choices regarding when and where they choose to get their information, traditional television broadcasters must expand their reach in order to remain competitive for audience attention.

Social media has enabled production staff in the studio (such as anchors, news directors, assignment desk managers, producers, social media desk managers, etc.) or staff in the field (such as production crews, reporters/on-air talent, camerapersons, technical crews, field producers, etc.) to quickly communicate with audiences using popular social media applications such as Twitter, Facebook, Google+ and others. By communicating directly with an audience during a live television production, it is possible to drive viewers immediately to a particular program to watch an event such as a breaking news story.

The challenge often is determining how does the television production staff in the field efficiently and easily contribute to social media as an integrated part of their normal process. Reporters and on-air talent are mostly occupied with presenting or gathering information for a live story/live shot, camera crews are focused on capturing the event, and technical crews are tasked with operating complex equipment.

It would be advantageous to enable the operator of a field camera (or other video capture device) or other person(s) in the field associated with the operation of the field camera, to instantly post selected images or video clips from the recorded video content to one or more social media outlets. It would be advantageous to enable such instantaneous posting of images or video clips via the simple press of a button. It would also be advantageous to enable production personnel remote from the field camera to receive and review images or video clips from the video content recorded in the field and instantly post such images or video clips to selected social media outlets.

The methods, apparatus, and systems of the present invention provide the foregoing and other advantages.

SUMMARY OF THE INVENTION

The present invention provides methods, apparatus, and systems for instantly posting images or video clips to social media websites during recording of video content.

In one example embodiment of a method for instantly posting images or video clips to social media websites during recording of video content, a video capture device is provided. A social media integration application is associated with the video capture device. The selection of a still image or video clip during recording of video content is enabled via a one-touch process. The selected still image or video clip is then processed by the social media integration application such that the still image or video clip is at least one of directly forwarded to and posted on one or more pre-selected social media websites via a network (such as the Internet) or forwarded to and posted on the one or more pre-selected social media websites via a web browser interface.

The one-touch process may be enabled by one of a push button on the video capture device, a touch screen button or swipe on a video display screen of the video capture device, a push button on an external device in communication with the video capture device, a touch screen button or swipe on a video display screen of the external device, a device shake of the video capture device, and a device shake of the external device.

The method may further comprise enabling the selection of the still image or video clip during playback of the recorded video content on the video display screen of the video capture device or on the video display screen of the external device.

The social media integration application may be running on one of the video capture device, an external device in communication with the video capture device, or the web browser interface.

In one example embodiment, the video capture device may be Internet enabled and the social media application may be running on the video capture device such that the video capture device forwards the selected still image or video clip to at least one of the one or more pre-selected social media websites or the web browser interface via the Internet.

In a further example embodiment, the external device may be Internet enabled and the social media application may be running on the external device such that the external device forwards the selected still image or video clip to at least one of the one or more pre-selected social media websites or the web browser interface via the Internet.

The method may further comprise recording metadata with the video content and forwarding the metadata together with the still image or video clip to at least one of the one or more pre-selected social media websites or the web browser interface. The metadata may comprise at least one of geographic location information of the video capture device, date and time information of the recording, event title, ownership information, copyright information, image size information, video clip size or length information, video format, or additional metadata predefined or dynamically logged by a user of the video capture device. The additional metadata information may include at least one of assignment name, geographic location, camera man name, reporter name, camera crew name, assistant name, producer name, story title, subject matter reference, program name, user comments, and the like.

At least one of a plurality of still images or video clips may be provided to the web browser interface. The at least one of the plurality of still images or video clips may be searchable via the web browser interface using the metadata information or the additional metadata information.

A length of the video clip may correspond to a length of time of touch of the one-touch process or to a pre-selected length of time.

A configuration application may be provided for configuring the social media integration application and the one-touch process. The configuration application may enable at least one of configuration of a length of video clip selected via the one-touch process, the recording of either the image or the video clip, the pre-selection of the one or more social media websites, creation of at least one of a comment and a message to accompany the image or the video clip, and the like.

The configuration application may be running on one of the video capture device, an external device in communication with the video capture device, or the web browser interface.

The web browser interface may be running on an Internet enabled device in communication with one of the video capture device or an external device associated with the video capture device.

A switch may be provided for configuring the one-touch process for the selection of a still image or a video clip. The switch may be located on one of the video capture device or an external device in communication with the video capture device.

The video capture device may comprise one of a video camera, a news camera, a camcorder, a television camera, a movie camera, a portable electronic device, a tablet computer, a smart phone, an IP or web camera, a smart watch, smart eyeglasses, portable sports cameras, or the like.

The web browser interface may be running on one of a television production facility computer, a newsroom computer, a mobile news production facility computer, a portable electronic device, a tablet computer, a smart phone, a smart watch, smart eyeglasses, and the like.

The selected still image or video clip may be stored in cloud-based storage and accessible via the web browser interface. The web browser interface may enable the pre-selection of the one or more social media websites and previewing of the selected still image or video clip stored at the cloud-based storage prior to posting the still image or video clip on the one or more pre-selected social media websites.

The video capture device may be configured to at least one of: periodically store at least one of still images or video clips during the recording; periodically forward at least one of the still images or the video clips to cloud based storage for access by the web browser interface; or periodically forward the still images or the video clips to the one or more pre-selected social media websites.

The present invention also includes apparatus and systems corresponding to the methods described above. An example embodiment of a system for instantly posting images or video clips to social media websites during recording of video content comprises a video capture device, a user interface associated with the video capture device enabling selection of a still image or video clip during recording of video content via a one-touch process, and a social media integration application associated with the video capture device for processing the selected still image or video clip such that the still image or video clip is at least one of directly forwarded to and posted on one or more pre-selected social media websites via a network or forwarded to and posted on the one or more pre-selected social media websites via a web browser interface.

The system and apparatus of the present invention may also include various features of the method embodiments discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods, apparatus, and systems for instantly sharing live video content (or select portions thereof) on social media concurrently with the recording thereof.

With the present invention, images or video clips from live high-definition quality video can be instantly shared on social media via a single click of a button. The present invention provides a simple method to contribute to social media by combining video capture with still image capture for a quick upload to social media websites and other social media applications.

Figure 1:
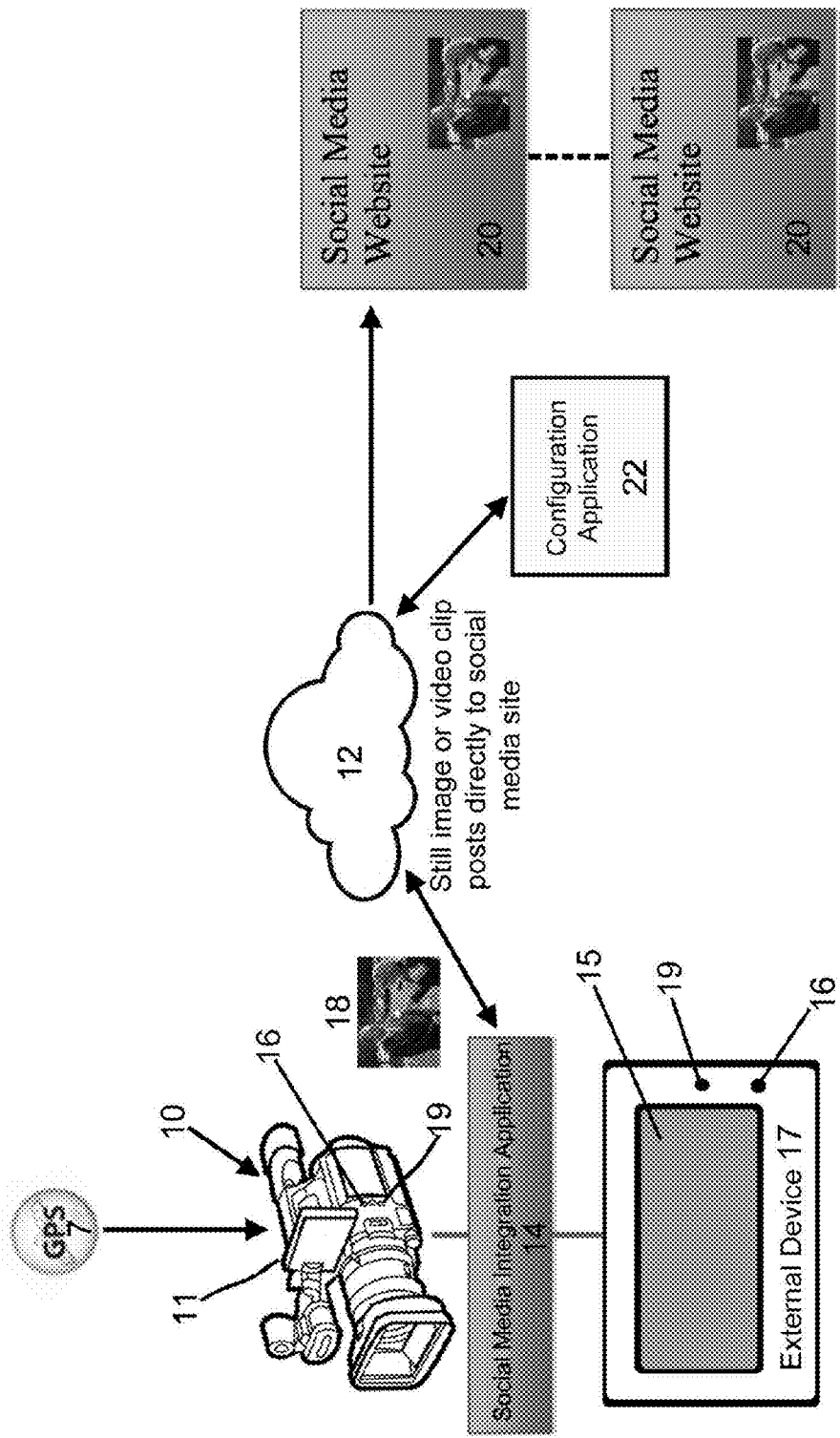
FIG. 1 shows a block diagram of a first example embodiment of the present invention.

In accordance with an example embodiment of the present invention as shown in FIG. 1, a video capture device 10 (e.g. a field camera or any other type of video recording device as discussed in detail below), is connected to a network 12 such as the Internet or a cellular telephone network (or other wide area network or local area network). A social media integration application 14 is associated with the video capture device 10. The selection of a still image or video clip 18 from the recorded video content, during the recording of the video content, is enabled by a one-touch process (e.g., a button 16 or similar one-touch actuation device as discussed in detail below). The selected still image or video clip 18 is then processed by the social media integration application 14 such that the still image or video clip 18 is at least one of directly forwarded to and posted on one or more pre-selected social media websites 20 via the network 12 or forwarded to and posted on the one or more pre-selected social media websites 20 via a web browser interface 24 (shown in FIG. 2).

The video capture device 10 may contain the necessary processor, memory and other hardware to run the social media integration application 14 and connect to the network 12.

Alternatively, the video capture device 10 may be connected to an external device 17 in proximity to the video capture device 10. In such an example embodiment, the external device 17 may run the social media integration application 14 and enable the one-touch process (as discussed in detail below). The external device 17 may be connected to the video capture device 10 via a wired or wireless connection. The external device 17 may comprise, for example, a tablet computer, a laptop, a smartphone, an Internet appliance, a smart watch, smart eyeglasses (e.g., Google Glass), or other Internet enabled device.

The one-touch process may be enabled by one of a push button 16 on the video capture device 10, a touch screen interface (e.g., touch screen button or swipe) on a video display screen 11 of the video capture device 10, a push button 16 on the external device 17 in communication with the video capture device 10, a touch screen interface (e.g., touch screen button or swipe) on a video display screen 15 of the external device 17, a device shake of the video capture device 10, and a device shake of the external device 17. With the present invention, a single touch, swipe or shake enables the capture of a still image or video clip 18 from the video currently being recorded (with or without its associated metadata information as discussed below), processes the still image or video clip 18 via social media integration application 14, and posts the still image or video clip 18 (with or without its associated metadata) to one or more pre-selected social media websites 20 of the user's choice.

Geographic location information may be provided by a GPS device 7 associated with the video capture device 10 or the external device 17. The GPS device 7 may be integrated into the video capture device 10 or the external device 17, or separate therefrom (for example, accessible by the video capture device 10 or the external device 17 via the network 12).

As is known in the art, video cameras may comprise a video screen and the capability to playback recorded content that is resident in the camera memory. Similar playback functionality can be provided on the external device 17. With such cameras and external devices, the same functionality can be provided to post video content that is recorded and played back on the video screen, such that, during playback of recorded content on the video screen (e.g. the video display screen 11 of the video capture device 10 or on the video display screen 15 of the external device 17), a selected image or video clip 18 from the recorded content being played back can be instantly posted (with or without its associated meta data) to one or more social media websites 20 via the one-touch process.

Either still images or selected video clips 18 can be posted to social media (either during live recording or local playback) by the push of the button 16. A length of the video clip may correspond to a length of time of touch of the one-touch process or to a pre-selected length of time. For example, pushing and holding the button 16 (during recording or local playback) may result in posting of a video clip from the video content corresponding to the length of time the button 16 was held. Alternatively, a switch may be provided for configuring the button 16 to select either still images or video clips 18 of a certain length (without having to hold the button 16).

The social media integration application 14 may be running on one of the video capture device 10, an external device 17 in communication with the video capture device 10, or the web browser interface 24.

In one example embodiment, the video capture device 10 may be Internet enabled and the social media application 14 may be running on the video capture device 10 such that the video capture device 10 forwards the selected still image or video clip 18 to at least one of the one or more pre-selected social media websites 20 or the web browser interface 24 via the Internet (e.g., network 12).

In a further example embodiment, the external device 17 may be Internet enabled and the social media application 14 may be running on the external device 17 such that the external device 17 forwards the selected still image or video clip 18 to at least one of the one or more pre-selected social media websites 20 or the web browser interface 24 via the Internet (e.g., network 12).

The method may further comprise recording metadata with the video content and forwarding the metadata together with the still image or video clip 18 to at least one of the one or more pre-selected social media websites 20 or the web browser interface 24. The metadata may comprise at least one of geographic location information of the video capture device 10, date and time information of the recording, event title, ownership information, copyright information, image size information, video clip size or length information, video format, and the like, or additional metadata predefined or dynamically logged by a user of the video capture device 10.

The additional metadata information may be entered by the user via a keypad on the video capture device 10, via a touch screen keypad on the video screen 11, or via the external device 17 (e.g., via a touch screen 15 or keypad), or via a configuration application 22. The additional metadata information may include at least one of assignment name, geographic location, camera man name, reporter name, camera crew name, assistant name, producer name, story title, subject matter reference, program name, user comments, and the like.

Figure 2:
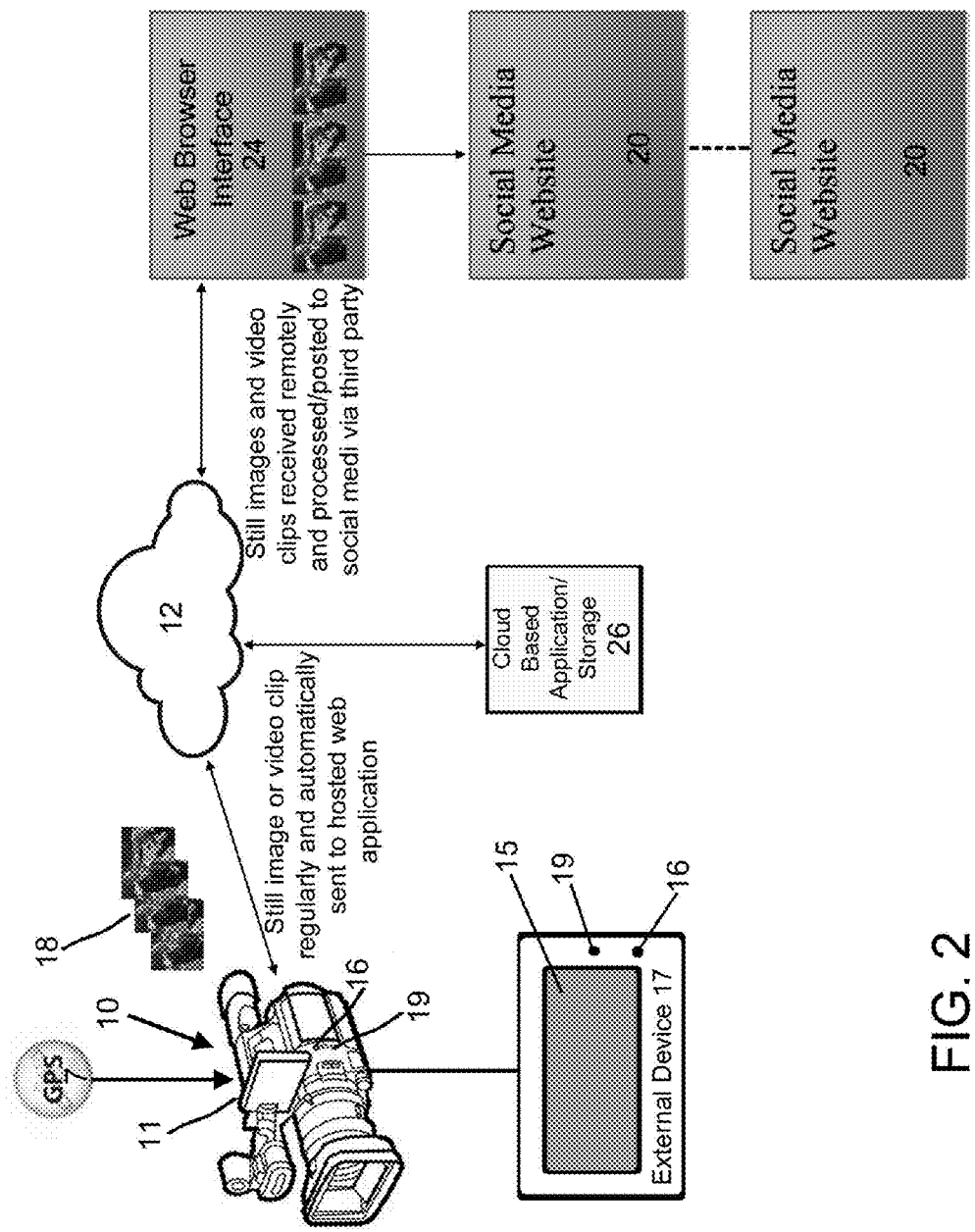
FIG. 2 shows a block diagram of a second example embodiment of the present invention.

As shown in FIG. 2, at least one of a plurality of still images or video clips 18 may be provided to the web browser interface 24 over the network 12. The at least one of the plurality of still images or video clips 18 may be searchable via the web browser interface 24 using the metadata information or the additional metadata information.

A configuration application 22 may be provided for configuring the social media integration application 14 and the one-touch process. The configuration application 22 may enable at least one of configuration of a length of video clip 18 selected via the one-touch process, the recording of either the image or the video clip 18, the pre-selection of the one or more social media websites 20, and creation of at least one of a comment and a message to accompany the image or the video clip 18.

The social media integration application 14 may be configured to post images or video clips to any social media account/website 20. The account information for accessing and posting to various social media websites 20 can be entered into the application 14 via a user interface associated with a video screen of the video capture device 10 or the external device 17, or via the configuration application 22. Therefore, the user or operator of the video capture device 10 may setup the social media integration application 14 to automatically and instantly post the selected images or video clips 18 to the desired social media websites 20, including but not limited to Facebook, Twitter, Instagram, YouTube, Flikr, Google+, LinkedIn, Pinterest, Tumblr, myspace, Reddit, Snapchat, Blogger, Vine, Pheed, Mobli, and any other similar social media websites or applications now existing or to be developed where pictures or video clips can be posted.

The configuration application 22 may be running on one of the video capture device 10, an external device 17 in communication with the video capture device 10, or the web browser interface 24, or on a separate device remote therefrom. The configuration application 22 may be adapted to run on any type of Internet enabled device, including but not limited to a computer, smartphone, tablet computer, Internet appliance, a smart watch, smart eyeglasses (e.g., Google Glass), or the like.

The web browser interface 24 may be running on an Internet enabled device in communication with one of the video capture device 10 or an external device 17 associated with the video capture device 10.

A switch 19 may be provided for configuring the one-touch process for the selection of a still image or a video clip 18. The switch 19 may be located on one of the video capture device 10 or an external device 17 in communication with the video capture device 10. The video capture device 10 may comprise any type of image or video capture device, including but not limited to a video camera, a news camera, a camcorder, a television camera, a movie camera, a portable electronic device, a tablet computer, a smart phone, an IP or web camera, a smart watch, smart eyeglasses (e.g., Google Glass), and portable sports video cameras (e.g., GoPro cameras), or the like.

The web browser interface 24 may be running on one of a television production facility computer, a newsroom computer, a mobile news production facility computer, a portable electronic device, a tablet computer, a smart phone, a smart watch, smart eyeglasses (e.g., Google Glass), and the like.

FIG. 2 shows a further example embodiment of the invention in which the video capture device 10 regularly and automatically transmits still images or video clips 18 of the captured video over the network 12 and provides remote access to these images or video clips 18 via a web browser interface 24. These images or video clips 18 can be viewed and selected via the web browser interface 24 for quick and easy posting to desired social media sites 20.

As shown in FIG. 2, a selected still image or video clip 18 may be stored in cloud-based storage 26 and accessible via the web browser interface 24. The web browser interface 24 may enable the pre-selection of the one or more social media websites 20 and previewing of the selected still image or video clip 18 stored at the cloud-based storage 26 prior to posting the still image or video clip 18 on the one or more pre-selected social media websites 24.

The video capture device 10 may be configured to at least one of: periodically store at least one of still images or video clips 18 during the recording; periodically forward at least one of the still images or the video clips 18 to cloud based storage for access by the web browser interface 24; or periodically forward the still images or the video clips 18 to the one or more pre-selected social media websites 20.

When used in connection with news reporting or other live television broadcasts (e.g., live sporting or entertainment events) the web browser interface 24 may be located remote from the video capture device 10, for example, at a production facility or newsroom. This enables the production crew to manage the desired social media accounts and post images (or video clips) to the desired social media websites 20 in concert with live news broadcasts.

In the FIG. 2 embodiment, the social media integration application 14 mentioned in connection with the FIG. 1 embodiment may not be required. Instead, the video capture device 10 may be configured to periodically store a still image or video clip 18 from the video content being recorded, and a cloud based application 26 that connects to the video capture device 10 (or a external device 17 associated therewith, such as the TVUPack product from TVU Networks Corporation) may be configured to periodically obtain the still images or video clips 18 from the video capture device 10, store the images or video clips in storage (implemented as part of cloud based application 26 or other storage accessible thereby) and make them accessible via the web browser interface 24. The selection (or pre-selection) of the desired social media websites 20 may be made at the web browser interface 24.

Alternatively, the video capture device 10 may include the social media integration application 14 described above in connection with FIG. 1, and the images or video clips 18 selected by the operator via the one-touch process are sent to cloud based application 26 and made accessible to the web browser interface 24 (rather than directly to the social media websites 20). In such an example embodiment, the web browser interface 24 shown in FIG. 2 may contain the web browser configuration application 22 shown in FIG. 1 and described above (or the configuration application 22 may be separately implemented in the FIG. 2 embodiment as described above in connection with FIG. 1). In this way, the video capture device 10 may be configured to either post images or video clips 18 selected by button 16 directly to social media websites 20 or to provide the images or video clips 18 to the web browser interface 24 periodically so that a remote operator can select the images or video clips 18 and also select which of the social media websites 20 they are to be posted to.

The web browser interface 24 may be configured to allow the operator thereof to search through the still images or video clips 18 using the metadata captured with the image or video clip by date and time, geographic location, event name, or any other metadata information provided with the image or video clip as discussed above.

Although the present invention is discussed herein in connection with the dissemination of news information, those skilled in the art will appreciate that the present invention, and particularly the FIG. 1 embodiment thereof, may also be employed for personal use. For example, the present invention can be implemented on consumer video cameras, smart phones, tablet computers, and the like, so that, when a user is recording video (e.g., home movies, vacation video, holiday videos, or recording any other events) still images or video clips can be posted to the user's selected social media websites 20. Similarly, the present invention can be also be employed for other commercial uses besides dissemination of news information, as will be apparent to those skilled in the art (including but not limited to advertisement and promotional purposes for business, and the like).

It should now be appreciated that the present invention provides advantageous methods and apparatus for instant one click posting of images or video clips from live or recorded video content to selected social media web sites.

Although the invention has been described in connection with various illustrated embodiments, numerous modifications and adaptations may be made thereto without departing from the spirit and scope of the invention as set forth in the claims.

What is claimed is:

1. A method for instantly posting images or video clips to social media websites during recording of video content, comprising:
   recording video content on a mobile video capture device, the video capture device comprising memory for storing the video content and a processor;
   providing a social media integration application associated with the processor of the video capture device;
   initiating a user selection of a still image or a video clip during live recording of the video content via a one-touch process initiated by a user from a user interface associated with the video capture device; and wherein the one-touch process results in automatically processing the currently selected still image or the currently selected video clip by the social media integration application such that the still image or the video clip is at least one of directly forwarded to and posted on one or more pre-selected social media websites via a network or forwarded to and posted on the one or more pre-selected social media websites via a web browser interface; and wherein the video clip comprises a portion of the video content.

2. A method in accordance with claim 1, wherein the one-touch process is enabled by one of a push button on the video capture device, a touch screen button or swipe on a video display screen of the video capture device, a push button on an external device in communication with the video capture device, a touch screen button or swipe on a video display screen of the external device, a device shake of the video capture device, and a device shake of the external device.

3. A method in accordance with claim 2, further comprising enabling the selection of the still image or the video clip during playback of the recorded video content on the video display screen of the video capture device or on the video display screen of the external device.

4. A method in accordance with claim 1, wherein the social media integration application is running on one of the video capture device, an external device in communication with the video capture device, or the web browser interface.

5. A method in accordance with claim 4, wherein the video capture device is Internet enabled and the social media integration application is running on the video capture device such that the video capture device forwards the selected still image or the video clip to at least one of the one or more pre-selected social media websites or the web browser interface via the Internet.

6. A method in accordance with claim 4, wherein the external device is Internet enabled and the social media integration application is running on the external device such that the external device forwards the selected still image or the video clip to at least one of the one or more pre-selected social media websites or the web browser interface via the Internet.

7. A method in accordance with claim 1, further comprising:
recording metadata with the video content;
forwarding the metadata together with the still image or the video clip to at least one of the one or more pre-selected social media websites or the web browser interface;
wherein the metadata comprises at least one of geographic location information of the video capture device, date and time information of the recording, event title, ownership information, copyright information, image size information, video clip size or length information, video format, or additional metadata predefined or dynamically logged by a user of the video capture device; and
the additional metadata information comprises at least one of assignment name, geographic location, camera man name, reporter name, camera crew name, assistant name, producer name, story title, subject matter reference, program name, and user comments.

8. A method in accordance with claim 7, wherein:
at least one of a plurality of still images or video clips are provided to the web browser interface; and
the at least one of the plurality of still images or video clips are searchable via the web browser interface using the metadata information or the additional metadata information.

9. A method in accordance with claim 1, wherein:
the video clip is selected for recording; and
a length of the video clip corresponds to one of a length of time of touch of the one-touch process or a pre-selected length of time.

10. A method in accordance with claim 1, further comprising providing a configuration application for configuring the social media integration application and the one-touch process.

11. A method in accordance with claim 10, wherein the configuration application enables at least one of configuration of a length of the video clip selected via the one-touch process, the recording of either the image or the video clip, the pre-selection of the one or more social media websites, and creation of at least one of a comment and a message to accompany the image or the video clip.

12. A method in accordance with claim 10, wherein the configuration application is running on one of the video capture device, an external device in communication with the video capture device, or the web browser interface.

13. A method in accordance with claim 1, wherein the web browser interface is running on an Internet enabled device in communication with one of the video capture device or an external device associated with the video capture device.

14. A method in accordance with claim 1, wherein:
a switch is provided for configuring the one-touch process for the selection of the still image or the video clip; and
the switch is located on one of the video capture device or an external device in communication with the video capture device.

15. A method in accordance with claim 1, wherein the video capture device comprises one of a video camera, a news camera, a camcorder, a television camera, a movie camera, a portable electronic device, a tablet computer, a smart phone, an IP or web camera, a smart watch, smart eyeglasses, and a portable sports video camera.

16. A method in accordance with claim 1, wherein the web browser interface is running on one of a television production facility computer, a newsroom computer, a mobile news production facility computer, a portable electronic device, a tablet computer, a smart phone, a smart watch, and smart eyeglasses.

17. A method in accordance with claim 1, wherein the selected still image or the video clip is stored in cloud-based storage and accessible via the web browser interface.

18. A method in accordance with claim 17, wherein the web browser interface enables the pre-selection of the one or more social media websites and previewing of the selected still image or the video clip stored at the cloud-based storage prior to posting the selected still image or the video clip on the one or more pre-selected social media websites.

19. A method in accordance with claim 1, wherein the video capture device is configured to at least one of: periodically store at least one of still images or video clips during the recording; periodically forward at least one of the still images or the video clips to cloud based storage for access by the web browser interface; or periodically forward the still images or the video clips to the one or more pre-selected social media websites.

20. A system for instantly posting images or video clips to social media websites during recording of video content, comprising:

a mobile video capture device for recording the video content, the video capture device comprising memory for storing the video content and a processor;

a user interface associated with the video capture device for initiating, by a user, a user selection of a still image or a video clip during live recording of the video content via a one-touch process; and a social media integration application associated with the processor of the video capture device for automatically processing the currently selected still image or the currently selected video clip as a result of the one-touch process such that the still image or the video clip is at least one of directly forwarded to and posted on one or more pre-selected social media websites via a network or forwarded to and posted on the one or more pre-selected social media websites via a web browser interface;

wherein the video clip comprises a portion of the video content.

* * * * *